(12) United States Patent
Sunkara et al.

(10) Patent No.: US 7,388,115 B2
(45) Date of Patent: *Jun. 17, 2008

(54) MANUFACTURE OF POLYTRIMETHYLENE ETHER GLYCOL

(75) Inventors: Hari Babu Sunkara, Hockessin, DE (US); Howard C. Ng, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/599,861

(22) Filed: Nov. 15, 2006

(65) Prior Publication Data

US 2007/0173669 A1    Jul. 26, 2007

Related U.S. Application Data

(63) Continuation-in-part of application No. 11/336,004, filed on Jan. 20, 2006, now Pat. No. 7,164,046.

(51) Int. Cl.
   *C07C 43/00*    (2006.01)
(52) U.S. Cl. .................................................. 568/619
(58) Field of Classification Search .................. None
   See application file for complete search history.

(56) References Cited

U.S. PATENT DOCUMENTS

| | | | |
|---|---|---|---|
| 5,015,789 A | 5/1991 | Arntz et al. | |
| 5,276,201 A | 1/1994 | Haas et al. | |
| 5,284,979 A | 2/1994 | Haas et al. | |
| 5,334,778 A | 8/1994 | Haas et al. | |
| 5,364,984 A | 11/1994 | Arntz et al. | |
| 5,364,987 A | 11/1994 | Haas et al. | |
| 5,633,362 A | 5/1997 | Nagarajan et al. | |
| 5,686,276 A | 11/1997 | Laffend et al. | |
| 5,821,092 A | 10/1998 | Nagarajan et al. | |
| 5,962,745 A | 10/1999 | Brossmer et al. | |
| 6,140,543 A | 10/2000 | Brossmer et al. | |
| 6,232,511 B1 | 5/2001 | Haas et al. | |
| 6,235,948 B1 | 5/2001 | Sunkara et al. | |
| 6,277,289 B1 | 8/2001 | Kurian et al. | |
| 6,284,930 B1 | 9/2001 | Haas et al. | |
| 6,297,408 B1 | 10/2001 | Haas et al. | |
| 6,331,264 B1 | 12/2001 | Kurian et al. | |
| 6,342,646 B1 | 1/2002 | Haas et al. | |
| 6,608,168 B1 | 8/2003 | Ng | |
| 6,720,459 B2 | 4/2004 | Sunkara et al. | |
| 6,977,291 B2 | 12/2005 | Sunkara et al. | |
| 7,157,607 B1 | 1/2007 | Sunkara et al. | |
| 7,161,045 B1 | 1/2007 | Sunkara et al. | |
| 2002/0007043 A1 | 1/2002 | Sunkara et al. | |
| 2004/0030095 A1 | 2/2004 | Sunkara et al. | |
| 2004/0225161 A1 | 11/2004 | Sunkara et al. | |
| 2004/0260125 A1 | 12/2004 | Seapan et al. | |
| 2005/0069997 A1 | 3/2005 | Adkesson et al. | |
| 2005/0227911 A1 | 10/2005 | Goldshtein et al. | |
| 2005/0272911 A1 | 12/2005 | Okoshi et al. | |
| 2005/0283028 A1 | 12/2005 | Sunkara et al. | |

OTHER PUBLICATIONS

U.S. Appl. No. 11/654,865, filed Jan. 18, 2007.

*Primary Examiner*—Yvonne Eyler
*Assistant Examiner*—Kellette Gale

(57) ABSTRACT

The present invention relates to a process of manufacture of polytrimethylene ether glycol, in which one or more inorganic compounds selected from alkali metal carbonates are utilized during certain purification steps to reduce phase separation time.

17 Claims, No Drawings

MANUFACTURE OF POLYTRIMETHYLENE ETHER GLYCOL

CROSS-REFERENCE TO RELATED APPLICATIONS

This is a continuation-in-part of application Ser. No. 11/336,004 (filed Jan. 20, 2006), now allowed U.S. Pat. No. 7,164,046, the disclosure of which is incorporated by reference herein for all purposes as if fully set forth.

FIELD OF THE INVENTION

The present invention relates to a process of manufacture of polytrimethylene ether glycol, in which one or more inorganic compounds selected from an inorganic salt and an inorganic base is utilized during certain purification steps to reduce phase separation time.

BACKGROUND OF THE INVENTION

Polytrimethylene ether glycol and its uses have been described in the art. Preferred methods for preparation of polytrimethylene ether glycol involve acid catalyzed polycondensation of 1,3-propanediol. For example, U.S. Pat. No. 6,720,459 and U.S. Pat. No. 6,977,291 disclose processes for preparation of polytrimethylene ether glycol from 1,3-propanediol using a polycondensation catalyst, preferably an acid catalyst.

WO99/01496 discloses a process for the purification of polyethers including the steps of (a) heating a polyether glycol with water for a time and at temperature sufficient to substantially hydrolyze esters formed during polymerization, (b) separating the polyether from the water, and (c) subjecting the polyether recovered from step (b) to further washing with hot water to remove residual acid.

U.S. Pat. No. 6,977,291 describes a purification procedure for crude polytrimethylene ether glycol obtained from an acid catalyzed polymerization process comprising (1) a hydrolysis step to hydrolyze the acid esters formed during the acid catalyzed polymerization, (2) phase separation and water extraction steps to remove the soluble acid catalyst, generating an organic phase and a waste aqueous phase, (3) a base treatment of the organic phase to neutralize and precipitate the residual acid present, and (4) drying and filtration of the polymer to remove residual water and solids. It is clear from U.S. Pat. No. 6,977,291 that, when sulfuric acid is used as a catalyst to make polyether glycols from their corresponding diols, it is preferred to include a hydrolysis step because a substantial portion of the acid is converted to the ester (alkyl hydrogen sulfate). These ester groups act as emulsifying agents during the water washing process, thus causing the washing process to be difficult and time consuming, and causing incomplete acid removal. The hydrolysis step is also important in order to obtain polymer with the high dihydroxy functionality required to use the polymer as a reactive intermediate. When the hydrolysis step is incorporated into the process, it is generally found that the phase separation between the water and polytrimethylene ether glycol phases can take a substantial amount of time, e.g., up to about 35-40 hours. Consequently, there is a need for a method to reduce the phase separation time.

US2005/0272911A1 and U.S. Provisional Application No. 60/761,291 (filed Jan. 23, 2006, entitled PROCESS FOR PRODUCING POLYTRIMETHYLENE ETHER GLYCOL) disclose polycondensation processes for preparing polyether polyols, including preparing polytrimethylene ether glycol from 1,3-propanediol, utilizing a polycondensation catalyst system that contains both an acid and a base. It is disclosed that the use of this catalyst system produces polyether polyol with high degree of polymerization and low color under mild conditions. The purification processes utilize a hydrolysis step wherein water and organic solvent that has affinity for both water and the polyether polyol are used and subsequent separation into aqueous and organic phases. In one example of US2005/0227911A1, there is disclosed the use of calcium hydroxide to treat the organic phase after the phase separation.

The disclosures of all of the above-identified publications are incorporated by reference herein for all purposes as if fully set forth. Commonly owned U.S. patent application Ser. No. 11/204,731 (filed Aug. 16, 2005) (the disclosure of which is incorporated by reference herein for all purposes as if fully set forth) relates to a process of manufacture of polytrimethylene ether glycol comprising: (a) polycondensing reactant comprising diol selected from the group consisting of 1,3-propanediol, 1,3-propanediol dimer and 1,3-propanediol trimer or mixtures thereof in the presence of acid polycondensation catalyst to form polytrimethylene ether glycol; (b) adding water to the polytrimethylene ether glycol and hydrolyzing the acid esters formed during the polycondensation to form a hydrolyzed mixture containing the polytrimethylene ether glycol and the hydrolyzed acid esters; (c) adding organic solvent that is miscible with water to the hydrolyzed mixture to form an aqueous-organic mixture comprising (i) organic phase containing polytrimethylene ether glycol and residual acid polycondensation catalyst from the polycondensing and (ii) water phase; (d) separating the water phase and the organic phase; (e) adding base to the separated organic phase to neutralize the residual acid polycondensation catalyst by forming salts of the residual acid polycondensation catalyst; (f) separating the organic phase into (i) liquid phase comprising the polytrimethylene ether glycol, the organic solvent and any residual water, and (ii) solid phase comprising the salts of the residual acid polycondensation catalyst and the base which is unreacted; and (g) removing the organic solvent and the residual water from the organic phase to obtain polytrimethylene ether glycol.

Commonly owned U.S. patent application Ser. No. 11/204,713 (filed Aug. 16, 2005) (the disclosure of which is incorporated by reference herein for all purposes as if fully set forth) discloses a process of manufacture of polytrimethylene ether glycol that is similar to that disclosed in previously incorporated U.S. patent application Ser. No. 11/204,731 (filed Aug. 16, 2005), except that an organic solvent that is miscible with polytrimethylene ether is added to the hydrolyzed aqueous mixture.

Both previously incorporated U.S. patent application Ser. No. 11/204,713 (filed Aug. 16, 2005) and Ser. No. 11/204,731 (filed Aug. 16, 2005) disclose that the addition of solvent to the hydrolyzed aqueous mixture promotes rapid separation of the water and organic phases. It would be highly desirable to have a process that promotes the rapid separation the water and organic phases yet minimizes or even avoids the use of organic solvents. The present invention describes such a process.

SUMMARY OF THE INVENTION

This invention is directed to a process of manufacture of polytrimethylene ether glycol comprising the steps of:
(a) polycondensing reactant comprising diol selected from the group consisting of 1,3-propanediol, 1,3-propanediol dimer and 1,3-propanediol trimer or mixtures thereof, in the presence of acid polycondensation catalyst to form polytrimethylene ether glycol;

(b) adding water to the polytrimethylene ether glycol and hydrolyzing the acid esters formed during the polycondensation to form a hydrolyzed mixture containing the polytrimethylene ether glycol and the hydrolyzed acid esters;

(c) adding one or more water-soluble, inorganic compounds to the hydrolyzed mixture to form an aqueous-organic mixture comprising (i) an organic phase containing polytrimethylene ether glycol and residual acid polycondensation catalyst from the polycondensing, and (ii) an aqueous phase;

(d) separating the aqueous phase and the organic phase;

(e) optionally adding base to the separated organic phase to neutralize the residual acid polycondensation catalyst by forming salts of the residual acid polycondensation catalyst;

(f) removing residual water from the organic phase;

(g) in the event that a base is added in step (e), and optionally otherwise, separating the organic phase into (i) a liquid phase comprising polytrimethylene ether glycol, and (ii) a solid phase comprising the salts of the residual acid polycondensation catalyst and the base which is unreacted.

Preferably, wherein the water-soluble, inorganic compound comprises an alkali metal carbonate, more preferably selected from potassium carbonate and/or sodium carbonate. In another preferred embodiment, the water-soluble, inorganic compound is an alkali metal carbonate, and still more preferably is sodium carbonate.

The water-soluble, inorganic compound preferably is added in an amount of from about 1 to about 20 wt %, more preferably from about 1 to about 10 wt %, and still more preferably from about 2 to about 8 wt %, based on the weight of the water added to the polytrimethylene ether glycol. The water-soluble, inorganic compound may be added in the form of an aqueous solution.

Preferably, the acid polycondensation catalyst is selected from the group consisting of sulfuric acid, hydriodic acid, fluorosulfonic acid, p-toluenesulfonic acid, benzenesulfonic acid, methanesulfonic acid, trifluoromethanesulfonic acid, 1,1,2,2-tetrafluoroethanesulfonic acid, and 1,1,1,2,3,3-hexafluoropropanesulfonic acid. Mixtures may also be used.

In one embodiment of the invention, the acid polycondensation catalyst further comprises base in an amount less than that required to neutralize the acid.

The step of adding water to the polytrimethylene ether glycol is preferably carried out by adding from about 10 to about 200 wt % water, based on the weight of the polytrimethylene ether glycol.

The hydrolyzing is preferably carried out at a temperature of from about 80 to about 110° C., and a pressure of from about 700 mm Hg to about 1600 mm Hg. More preferably, it is carried out at a temperature of from about 90 to about 110° C., and a pressure of from about 700 mm Hg to about 1600 mm Hg, in an inert atmosphere.

The step of separating the water phase and the organic phase preferably comprises the steps of allowing the aqueous-organic mixture to stand without agitation at a temperature of from about 85 to about 100° C. for a time sufficient for the organic and water phases to separate, and then draining or decanting the water phase.

Base may optionally be added to the separated organic phase, as necessary, to form salts of any residual acid polycondensation catalyst. When an inorganic base is utilized as the water-soluble inorganic compound, however, it may not be necessary to add base, and is thus one case where adding base may be optional. It is preferred to add base, if required and as required, to form such catalyst salt. The base is preferably an alkaline earth metal oxide or hydroxide. The base is preferably selected from the group consisting of calcium hydroxide, calcium oxide, magnesium hydroxide, magnesium oxide, barium oxide and barium hydroxide. Mixtures may also be used. The neutralization may be carried out at a temperature of from about 50 to about 90° C.

The step of separating the organic phase into (i) liquid phase comprising the polytrimethylene ether glycol, and (ii) solid phase comprising the salts of the residual acid polycondensation catalyst and the base which is unreacted, is optionally and generally not necessary when no base is added to the separated organic phase. When utilized, this step is preferably carried out by filtration or centrifugation.

DETAILED DESCRIPTION OF THE PREFERRED EMBODIMENTS

Unless otherwise defined, all technical and scientific terms used herein have the same meaning as commonly understood by one of ordinary skill in the art to which this invention belongs. In case of conflict, the present specification, including definitions, will control.

Although methods and materials similar or equivalent to those described herein can be used in the practice or testing of the present invention, suitable methods and materials are described herein.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Use of "a" or "an" are employed to describe elements and components of the invention. This is done merely for convenience and to give a general sense of the invention. This description should be read to include one or at least one, and the singular also includes the plural unless it is obvious that it is meant otherwise.

The materials, methods, and examples herein are illustrative only and, except as specifically stated, are not intended to be limiting.

This invention is directed to a method for manufacture of polytrimethylene glycol using an acid polycondensation catalyst. The method includes a novel and improved process for purification of the polytrimethylene ether glycol.

The starting material for the process is reactant comprising at least one of 1,3-propanediol, 1,3-propanediol dimer and 1,3-propanediol trimer, or mixtures thereof. The 1,3-propanediol reactant employed in the process of the present invention may be obtained by any of the various chemical routes or by biochemical transformation routes. Preferred routes are described in U.S. Pat. No. 5,015,789, U.S. Pat. No. 5,276,201, U.S. Pat. No. 5,284,979, U.S. Pat. No. 5,334,778, U.S. Pat. No. 5,364,984, U.S. Pat. No. 5,364,987, U.S. Pat. No. 5,633,362 U.S. Pat. No. 5,686,276, U.S. Pat. No. 5,821,092, U.S. Pat. No. 5,962,745, U.S. Pat. No. 6,140,543, U.S. Pat. No. 6,232,511, U.S. Pat. No. 6,235,948, U.S. Pat. No. 6,277,289, U.S. Pat. No. 6,284,930, U.S. Pat. No. 6,297,408, U.S. Pat. No. 6,331,264, U.S. Pat. No. 6,342,646, US2004/0225161A1, US2004/0260125A1 and US2005/0069997A1, the disclosures of which are incorporated herein by reference for all purposes as if fully set forth. Preferably the 1,3-propanediol used as the reactant or as a component of the reactant will have a purity of greater than about 99% by weight as determined by gas chromatographic analysis.

Although any of 1,3-propanediol, and dimers or trimers of 1,3-propanediol can be used as the reactant in the process of the invention, it is preferred that the reactant comprise about 90% or more by weight of 1,3-propanediol. More preferably, the reactant will comprise 99% or more by weight of 1,3-propanediol.

The starting material for the present invention may also contain small amounts, preferably no more than about 30%, more preferably no more than about 10%, by weight, of the starting material, of comonomer diols in addition to the reactant 1,3-propanediol or its dimers and trimers without detracting from the efficacy of the process. Examples of preferred comonomer diols include ethylene glycol, 2-methyl-1,3-propanediol, 2,2-dimethyl-1,3 propane diol, and $C_6$-$C_{12}$ diols such as 2,2-diethyl-1,3-propanediol, 2-ethyl-2-hydroxymethyl-1,3-propanediol, 1,6-hexanediol, 1,8-octanediol, 1,10-decanediol, 1,12-dodecanediol, 1,4-cyclohexanediol and 1,4-cyclohexanedimethanol. A more preferred comonomer diol is ethylene glycol. Polytrimethylene ether glycols prepared from 1,3-propanediol and ethylene glycol are described in US2004/0030095A1, the disclosure of which is incorporated by reference herein for all purposes as if fully set forth.

The polytrimethylene ether glycols of this invention can also be prepared using from about 10 to about 0.1 mole percent of an aliphatic or aromatic diacid or diester, preferably terephthalic acid or dimethyl terephthalate, and most preferably terephthalic acid, as described in detail in U.S. Pat. No. 6,608,168, the disclosure of which is incorporated by reference herein for all purposes as if fully set forth.

Stabilizers (e.g., UV stabilizers, thermal stabilizers, antioxidants, corrosion inhibitors, etc.), viscosity boosters, antimicrobial additives and coloring materials (e.g., dyes, pigments, etc.) may be added to the polymerization mixture or final product if necessary.

Any acid catalyst suitable for acid catalyzed polycondensation of 1,3-propanediol may be used in present process. Preferred acid polycondensation catalysts are described in previously incorporated U.S. Pat. No. 6,977,291 and U.S. Pat. No. 6,720,459. They are preferably selected from the group consisting of Lewis acids, Bronsted acids, super acids and mixtures thereof, and they include both homogeneous and heterogeneous catalysts. More preferably, the catalysts are selected from the group consisting of inorganic acids, organic sulfonic acids, heteropolyacids and metal salts. Still more preferably, the catalyst is a homogeneous catalyst, preferably selected from the group consisting of sulfuric acid, hydriodic acid, fluorosulfonic acid, phosphorous acid, p-toluenesulfonic acid, benzenesulfonic acid, methanesulfonic acid, phosphotungstic acid, trifluoromethanesulfonic acid, phosphomolybdic acid, 1,1,2,2-tetrafluoroethanesulfonic acid, 1,1,1,2,3,3-hexafluoropropanesulfonic acid, bismuth triflate, yttrium triflate, ytterbium triflate, neodymium triflate, lanthanum triflate, scandium triflate and zirconium triflate. The catalyst can also be a heterogeneous catalyst, preferably selected from the group consisting of zeolites, fluorinated alumina, acid-treated alumina, heteropolyacids and heteropolyacids supported on zirconia, titania alumina and/or silica. An especially preferred catalyst is sulfuric acid.

Preferably, the polycondensation catalyst is used in an amount of from about 0.1 wt % to about 3 wt %, more preferably from about 0.5 wt % to about 1.5 wt %, based on the weight of reactant.

The process of this invention may also be carried out using a base as a component of the catalyst system, such as the polycondensation catalyst that contains both an acid and a base described in previously incorporated US2005/0272911A1 and U.S. Provisional Application No. 60/761,291 (filed Jan. 23, 2006, entitled PROCESS FOR PRODUCING POLYTRIMETHYLENE ETHER GLYCOL). When base is used as a component of the polycondensation catalyst, the amount of base should be such that it insufficient to neutralize all of the acid present in the catalyst.

The polymerization process can be batch, semi-continuous, continuous, etc. A preferred batch process is described in previously incorporated US2002/0007043A1. In this embodiment, the polytrimethylene-ether glycol is prepared by a process comprising the steps of: (a) providing (1) reactant, and (2) acid polycondensation catalyst; and (b) polycondensing the reactants to form a polytrimethylene ether glycol. The reaction is conducted at an elevated temperature of at least about 150° C., more preferably at least about 160° C., up to about 210° C., more preferably about 200° C. The reaction is preferably conducted either at atmospheric pressure in the presence of inert gas or at reduced pressure (i.e., less than 1 atmosphere), preferably less than about 500 mm Hg in an inert atmosphere, and extremely low pressures can be used (e.g., as low as about 1 mm Hg).

A preferred continuous process for preparation of the polytrimethylene ether glycols of the present invention is described in previously incorporated U.S. Pat. No. 6,720,459. Thus, in this embodiment the polytrimethylene ether glycol is prepared by a continuous process comprising: (a) continuously providing (i) reactant, and (ii) polycondensation catalyst; and (b) continuously polycondensing the reactant to form polytrimethylene ether glycol Regardless of whether the process is a continuous or batch process, or otherwise, when a homogeneous acid catalyst, particularly sulfuric acid, is used, a substantial amount of acid ester is formed from reaction of the catalyst with the hydroxyl compounds. In the case of sulfuric acid, a substantial portion of the acid is converted to the ester, alkyl hydrogen sulfate. It is important to remove these acid esters because they act as emulsifying agents during the water washing used to remove catalyst and therefore cause the washing process to be difficult and time consuming. Moreover, the hydrolysis step is also important in order to obtain polymer with the high dihydroxy functionality required to use the polymer as a reactive intermediate.

Thus, the next step comprises hydrolyzing the acid esters formed during the polycondensing that are in the aqueous-organic mixture.

The hydrolysis step is preferably carried out by adding water to the polymer. The amount of water added can vary and is preferably from about 10 to about 200 wt %, more preferably from about 50 to about 100 wt %, based on the weight of the polytrimethylene ether glycol. Hydrolysis is preferably carried out by heating the aqueous-organic mixture to at a temperature range from about 80 to about 110° C., preferably from about 90 to about 110° C. (preferably from about 90 to about 100° C. when carried out at atmospheric pressure), for a period of sufficient time to hydrolyze the acid esters. The hydrolysis step is preferably conducted at atmospheric or slightly above atmospheric pressure, preferably at about 700 mmHg to about 1600 mmHg. Higher pressures can be used, but are not preferred. The hydrolysis step is carried out preferably under inert gas atmosphere.

To the aqueous polytrimethylene ether glycol mixture after hydrolysis is added one or more water-soluble, inorganic compounds to form an aqueous-organic mixture comprising (i) an organic phase containing polytrimethylene ether glycol and residual acid polycondensation catalyst from the polycondensing and (ii) an aqueous phase.

The water-soluble, inorganic compounds for use in the invention are preferably inorganic salts and/or inorganic bases. Preferred salts are those comprising a cation selected from the group consisting of ammonium ion, Group IA metal cations, Group IIA metal cations and Group IIIA metal cations, and an anion selected from the group consisting of fluoride, chloride, bromide, iodide, carbonate, bicarbonate, sulfate, bisulfate, phosphate, hydrogen phosphate, and dihydrogen phosphate (preferably chloride, carbonate and bicarbonate). Group IA cations are lithium, sodium, potassium, rubidium, cesium and francium cations (preferably lithium, sodium and potassium); Group IIA cations are beryllium, magnesium, calcium, strontium, barium and radium (preferably magnesium and calcium); and Group IIIA cations are aluminum, gallium, indium and thallium cations. More preferred salts for the purposes of the invention are ammonium chloride, lithium chloride, sodium chloride, potassium chloride, magnesium chloride, calcium chloride, sodium carbonate and sodium bicarbonate. The most preferred salt is sodium chloride.

Typical inorganic bases for use in the invention are ammonium hydroxide and water-soluble hydroxides derived from any of the above-mentioned Group IA, IIA and IIIA metal cations. The most preferred water-soluble inorganic bases are sodium hydroxide and potassium hydroxide.

The amount of water-soluble, inorganic compound used may vary, but is preferably the amount effective in promoting the rapid separation of the water and inorganic phases. The preferred amount for this purpose is from about 1 to about 20 wt %, more preferred amount from about 1 to about 10 wt %, and still more preferably from about 2 to about 8 wt %, based on the weight of the water added to the polytrimethylene ether glycol in the hydrolysis step.

The next step comprises separating the water phase and the organic phase. Separation is preferably carried out by allowing the water phase and the organic phase to separate and settle so that the water phase can be removed. The reaction mixture is allowed to stand, preferably without agitation until settling and phase separation has occurred. The time required for the separation and settling will be less, and preferably substantially less, than that required for a process that is the same except for the omission of the water-soluble inorganic compound.

Prior to this invention it was found that this period of phase separation and settling could be protracted. For example, with prior processes it was not unusual for the settling to take as long as several hours before the phases separated sufficiently to proceed. Using the method of the invention can substantially shorten the period for phase separation after hydrolysis. Preferably the time required for phase separation is less than about one hour. More preferably this time period is from less than about 1 minute to about one hour, and most preferably about 30 minutes or less.

Previously incorporated U.S. patent application Ser. No. 11/204,713 (filed Aug. 16, 2005) and Ser. No. 11/204,731 (filed Aug. 16, 2005) disclose processes for preparing polytrimethylene ether glycol by acid polycondensation wherein the phase separation after hydrolysis is promoted by addition of organic solvent miscible with polytrimethylene ether glycol in the case of previously incorporated U.S. patent application Ser. No. 11/204,713 (filed Aug. 16, 2005), and miscible with water in the case of previously incorporated U.S. patent application Ser. No. 11/204,731 (filed Aug. 16, 2005). The solvents disclosed in these two applications also may be used conjunction with the water-soluble inorganic compounds disclosed herein to promote phase separation.

Once phase separation has occurred, the water phase and the organic phase can be split, preferably by decantation or draining. It is advantageous to retain the organic phase in the reactor for subsequent processing. Consequently, when the organic phase is on bottom it is preferably to decant off the aqueous phase and when the organic phase is on top, it is preferred to drain off the aqueous phase.

Following the hydrolysis and phase separation steps, a base, preferably a substantially water-insoluble base, may be added to neutralize any remaining acid. During this step residual acid polycondensation catalyst is converted into its corresponding salts.

Preferably, the base is selected from the group consisting of alkaline earth metal hydroxides and alkaline earth metal oxides. More preferably, the base is selected from the group consisting of calcium hydroxide, calcium oxide, magnesium hydroxide, magnesium oxide, barium oxide and barium hydroxide. Mixtures may be used. A particularly preferred base is calcium hydroxide. The base may be added as a dry solid, or preferably as an aqueous slurry. The amount of insoluble base utilized in the neutralization step is preferably at least enough to neutralize all of the acid polycondensation catalyst. More preferably a stoichiometric excess of from about 0.1 wt % to about 10 wt % is utilized. The neutralization is preferably carried out at 50 to 90° C. for a period of from 0.1 to 3 hours under nitrogen atmosphere.

Next, the residual water is preferably removed from the organic phase by vacuum stripping (e.g., distillation at low pressure), generally with heating, which will also remove organic solvent if present and, if desired, unreacted monomeric materials. Other techniques can be used, such as distillation at about atmospheric pressure.

When base is added in step (e) such that residual acid catalyst salts are formed, the organic phase is separated into (i) a liquid phase comprising the polytrimethylene ether glycol, and (ii) a solid phase comprising the salts of the residual acid polycondensation catalyst and unreacted base. Typically, this occurs by filtration (preferably with use of filter-aid material, for example as disclosed in U.S. Pat. No. 2005/028302A1, the disclosure of which is incorporated by reference herein for all purposes as if fully set forth), or centrifugation, to remove the base and the acid/base reaction products. Centrifugation and filtration methods are generally well known in the art. For example, filtration under the earth's gravity, centrifugal filtration, or pressure filtration can be used. Filter presses, candle filters, pressure leaf filters or conventional filter papers are also be used for the filtration, which can be carried out batch wise or continuously. Filtration in the presence of a filter-aid is preferred at a temperature range from 50 to 100° C. at a pressure range from 1 to 5 bars.

Even if base is not added in step (e), purification techniques like centrifugation and filtration may still be desirable for refining the final product.

The remaining polytrimethylene ether glycol will preferably have a number average molecular weight (Mn) of from about 250 to about 5,000. Mn of 1,000 to 3,000 is preferred for many applications.

The potential advantages of this novel process in terms of reduction of phase separation time have already been discussed. However, there may be additional advantages, which although more difficult to quantify, are highly significant.

For example, previous processes usually require more than one water wash because of the difficulty of phase separation. The processes of the invention, however, usually require only one water wash and consequently minimize the amount of waste water produced. Moreover, the reduced number of water washes minimizes the amount of low molecular weight oligomers lost because of water solubility, and therefore increases the polymer yield.

The invention is illustrated in the following examples. All parts, percentages, etc., referred to in the examples are by weight unless otherwise indicated.

EXAMPLES

The 1,3-propanediol utilized in the examples was prepared by biological methods described in previously incorporated US2005/0069997A1, and had a purity of >99.8%.

Comparative Example 1

The example describes preparation of polytrimethylene ether glycol without the use of added water-soluble inorganic compound, for comparison with the examples that follow.

1,3-Propanediol (605 g) and 5.5 g of sulfuric acid were charged into a 1 L glass flask and then heated at 166+/−1° C. under nitrogen for 24 hours to produce polytrimethylene ether glycol. During the reaction, by-product water was removed by nitrogen sparging.

After the 24-hour heating period, 400 g of de-ionized water was added and the resulting aqueous mixture was held at 95° C. for 4 hours under nitrogen to hydrolyze the acid ester formed during the acid catalyzed polycondensation.

After hydrolysis, the reaction mixture was cooled to 60° C. and allowed to stand for phase separation. About 5 hours were required for separation into two phases, the bottom layer being the organic phase and the top layer the aqueous phase.

After the aqueous phase was removed, an additional 400 g of deionized water was added and the resulting aqueous mixture was held at 95° C. for 1 hour under nitrogen to extract catalyst residues from the organic phase. After extraction, the reaction mixture was cooled to 60° C. and allowed to remain without agitation for phase separation. About 5 hours were required for separation into two phases, the bottom layer being the organic phase and the top layer the aqueous phase.

The organic phase was transferred into a rotary-evaporator and analyzed by titration to determine the amount of base necessary for neutralization of the residual acid; 0.5 g of calcium hydroxide was added. The resulting mixture was stirred at 70° C. for 1 hour.

After neutralization, the temperature was increased to 90° C. and held at that temperature for 3 hours at 10 mm of Hg to remove residual water. After drying, the mixture was filtered under 15 psig nitrogen to obtain the purified polytrimethylene ether. Filtration time was about 7 hours.

Example 1

This example describes preparation of polytrimethylene ether glycol utilizing 2.5 wt % sodium chloride as added water-soluble inorganic compound.

1,3-Propanediol (605 g) and 5.5 g of sulfuric acid were charged into a 1 L glass flask and then heated at 166+/−1° C. under nitrogen for 24 hours to produce polytrimethylene ether glycol. During the reaction, by-product water was removed by nitrogen sparging.

After the 24-hour heating period, 200 g of de-ionized water was added and the resulting aqueous mixture was held at 95° C. for 4 hours under nitrogen to hydrolyze the acid ester formed during the acid catalyzed polycondensation.

After hydrolysis, 22 g of 25 wt % aqueous sodium chloride solution was added followed by mixing for 10 minutes. At the end of this time agitation was stopped and the mixture allowed to stand for phase separation.

After settling, the organic phase (top layer) was titrated with base to determine the amount of base necessary for neutralization of the residual acid, and then 0.19 g of calcium hydroxide was added. The resulting mixture was stirred at 70° C. for 1 hour.

After neutralization, the mixture was heated in a rotary evaporator at 90° C. for 3 hours at 10 mm Hg to remove the residual water, and then it was filtered at 15 psig nitrogen to remove solids and obtain product polytrimethylene ether glycol.

Example 2

This example describes preparation of polytrimethylene ether glycol utilizing 4 wt % sodium chloride as added water-soluble inorganic compound.

Polymerization and hydrolysis of 1,3-propanediol were carried out as described above for Example 1.

After hydrolysis, 38 g of 25 wt % aqueous sodium chloride solution was added to the hydrolyzed mixture followed by mixing for 10 minutes. At the end of this time agitation was stopped and the mixture allowed to stand for phase separation. After the mixture was separated into two phases (organic phase at the bottom, aqueous phase at the top), the aqueous phase was separated and discarded. The organic phase was titrated with base to determine the amount of base required for neutralization of residual acid, and based on the results, 0.18 g of calcium hydroxide was added to neutralize the residual acid catalyst. The resulting mixture was stirred at 70° C. for 1 hour.

The drying and filtration steps were carried out as described above for Example 1.

Example 3

This example describes preparation of polytrimethylene ether glycol utilizing 8 wt % sodium chloride as added water-soluble inorganic compound.

Polymerization, hydrolysis, phase separation and neutralization were carried out as in Example 1 except that 94 g of 25 wt % aqueous sodium chloride solution was added to promote phase separation.

The results of Examples 1-3 and Comparative Example 1 are summarized in Table 1.

TABLE 1

| Example No. | Sodium Chloride in Aqueous Phase, Wt % | Phase Separation Time Minutes |
| --- | --- | --- |
| Comparative Exp. 1 | 0 | 300 |
| 1 | 2.5 | 2 |
| 2 | 4 | 1 |
| 3 | 8 | 1 |

The data in Table 1 show that addition of sodium chloride substantially decreased the time required for phase separation.

Examples 4-6

These examples describes preparation of polytrimethylene ether glycol using 4 wt % potassium chloride, 4 wt % calcium chloride and 4 wt % sodium carbonate as added water-soluble inorganic compounds.

Polymerization of 1,3-propanediol and hydrolysis of the products were carried out as described in Example 1. After hydrolysis an appropriate amount of aqueous solution of the particular salt was added to the hydrolyzed mixture followed by mixing for 10 minutes. At the end of this time agitation was stopped and the mixture was allowed to stand for phase separation. After phase separation the aqueous phase was separated and discarded, and the organic phase was titrated with base to determine the amount required for neutralization of residual acid.

Based on the result of the titration, the required amount of calcium hydroxide was added, and the resulting mixture was stirred at 70° C. for 1 hour.

The drying and filtration steps were carried out as described above for Example 1.

The phase separation times are summarized in Table 2.

TABLE 2

| Example No. | Salt | Phase Separation Time, Minutes |
| --- | --- | --- |
| Comparative Example 1 | None | 300 |
| 4 | Potassium Chloride | 1 |
| 5 | Calcium Chloride | 1 |
| 6 | Sodium Carbonate | 2 |

These results demonstrate the utility of a wide variety of inorganic salts in substantially reducing the phase separation time in the process of the invention.

Example 7

This example describes preparation of polytrimethylene ether glycol using a mixture of sodium chloride and sodium hydroxide as the added water-soluble inorganic compounds to promote phase separation.

1,3-Propanediol (605 g) and 5.5 g of sulfuric acid were charged into a 1 L glass flask and then heated at 166+/−1° C. under nitrogen for 12 hours to produce polytrimethylene ether glycol. During the reaction, by-product water was removed by nitrogen sparging.

After the heating period, 200 g of de-ionized water was added and the resulting aqueous mixture was held at 95° C. for 4 hours under nitrogen to hydrolyze the acid ester formed during the acid catalyzed polycondensation.

After hydrolysis, 43 g of 25 wt % aqueous sodium chloride solution and 14.2 g of 30 wt % aqueous sodium hydroxide solution were added to the hydrolyzed mixture followed by mixing for 10 minutes. At the end of this time agitation was stopped and the mixture allowed to stand for phase separation. Phase separation required 4 minutes. After separation the organic phase was titrated with base to determine the amount of base required for neutralization of residual acid, and based on the results, 0.025 g of calcium hydroxide was added to neutralize the residual acid catalyst. The resulting mixture was stirred at 70° C. for 1 hour. After neutralization, the drying and filtration steps were carried out as described in Example 1.

Example 8

This example describes preparation of polytrimethylene ether glycol utilizing sodium chloride as the water-soluble inorganic compound and toluene as organic solvent to improve the phase separation rate.

Polymerization of 1,3-propanediol and hydrolysis of the polytrimethylene ether glycol product mixture were carried out as described in Example 7.

After hydrolysis, 38 g of 25 wt % aqueous sodium chloride solution and 133 g of toluene were added to the hydrolyzed mixture followed by mixing for 10 minutes. At the end of this time agitation was stopped and the mixture allowed to stand for phase separation. Phase separation required 4 minutes. After separation the organic phase was titrated with base to determine the amount of base required for neutralization of residual acid, and based on the results, 0.046 g of calcium hydroxide was added to neutralize the residual acid catalyst. The resulting mixture was stirred at 70° C. for 1 hour. After neutralization, the drying and filtration steps were carried out as described in Example 1 except that both toluene and residual water were removed during the drying step.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the disclosure.

What is claimed is:

1. A process of manufacture of polytrimethylene ether glycol comprising the steps of:
   (a) polycondensing reactant comprising diol selected from the group consisting of 1,3-propanediol, 1,3-propanediol dimer and 1,3-propanediol trimer or mixtures thereof, in the presence of acid polycondensation catalyst to form polytrimethylene ether glycol;
   (b) adding water to the polytrimethylene ether glycol and hydrolyzing the acid esters formed during the polycondensation to form a hydrolyzed mixture containing the polytrimethylene ether glycol and the hydrolyzed acid esters;

(c) adding one or more water-soluble, inorganic compounds to the hydrolyzed mixture to form an aqueous-organic mixture comprising (i) an organic phase containing polytrimethylene ether glycol and residual acid polycondensation catalyst from the polycondensing, and (ii) an aqueous phase, wherein the water-soluble, inorganic compound comprises an alkali metal carbonate;

(d) separating the aqueous phase and the organic phase;

(e) optionally adding base to the separated organic phase to neutralize the residual acid polycondensation catalyst by forming salts of the residual acid polycondensation catalyst;

(f) removing residual water from the organic phase;

(g) in the event that a base is added in step (e), and optionally otherwise, separating the organic phase into (i) a liquid phase comprising polytrimethylene ether glycol, and (ii) a solid phase comprising the salts of the residual acid polycondensation catalyst and the base which is unreacted.

2. The process of claim 1, wherein the water-soluble inorganic compound is an alkali metal carbonate.

3. The process of claim 1, wherein the water-soluble inorganic compound is selected from the group consisting of sodium carbonate and potassium carbonate.

4. The process of claim 1, wherein the water-soluble inorganic compound comprises sodium carbonate.

5. The process of claim 1, wherein the water-soluble inorganic compound is added in an amount of from about 1 to about 20 wt %, based on the weight of the water added to the polytrimethylene ether glycol.

6. The process of claim 1, wherein the water-soluble inorganic compound is added in an amount of from about 1 to about 10 wt %, based on the weight of the water added to the polytrimethylene ether glycol.

7. The process of claim 1, wherein the water-soluble inorganic compound is added in an amount of from about 2 to about 8 wt %, on the weight of the water added to the polytrimethylene ether glycol.

8. The process of claim 1, wherein the water-soluble inorganic compound is added in aqueous solution.

9. The process of claim 1, wherein the adding water to the polytrimethylene ether glycol is carried out by adding from about 10 to about 200 wt % water, based on the weight of the polytrimethylene ether glycol.

10. The process of claim 1, wherein separating the water phase and the organic phase comprises the steps of allowing the aqueous-organic mixture to stand without agitation at a temperature of from about 85 to about 100° C. for a time sufficient for the organic and water phases to separate, and then draining or decanting the water phase.

11. The process of claim 1, wherein the acid polycondensation catalyst comprises base in an amount less than that required to neutralize the acid.

12. The process of claim 11, wherein the base is the same as the water-soluble inorganic compound from step (c).

13. The process of claim 11, wherein the base comprises an alkali metal carbonate.

14. The process of claim 11, wherein the base is selected from the group consisting of sodium carbonate and potassium carbonate.

15. The process of claim 11, wherein the base comprises sodium carbonate.

16. The process of claim 11, wherein the acid polycondensation catalyst comprises sulfuric acid and sodium carbonate.

17. The process of claim 1, wherein step (e) does not occur.

* * * * *